(12) United States Patent
Bazer-Bachi et al.

(10) Patent No.: US 8,906,319 B2
(45) Date of Patent: Dec. 9, 2014

(54) DISTRIBUTOR PLATE FOR THE DISTRIBUTION OF A POLYPHASE MIXTURE WITH PERIPHERY-TRUNCATED SHAFTS

(71) Applicant: IFP Energies Nouvelles, Rueil-Malmaison Cedex (FR)

(72) Inventors: Frederic Bazer-Bachi, Irigny (FR); Frederic Augier, Saint Symphorien D Ozon (FR); Yacine Haroun, Grigny (FR); Christophe Boyer, Charly (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 13/630,011

(22) Filed: Sep. 28, 2012

(65) Prior Publication Data
US 2013/0092601 A1 Apr. 18, 2013

(30) Foreign Application Priority Data

Sep. 30, 2011 (FR) .................................... 11 02981

(51) Int. Cl.
*B01J 8/02* (2006.01)
*C10G 45/00* (2006.01)
*C10G 49/00* (2006.01)
*B01J 8/00* (2006.01)
*B01J 8/04* (2006.01)

(52) U.S. Cl.
CPC .............. *B01J 8/02* (2013.01); *C10G 49/002* (2013.01); *B01J 8/008* (2013.01); *B01J 8/0278* (2013.01); *B01J 8/0492* (2013.01)
USPC ........... 422/310; 422/607; 422/220; 208/107; 208/142; 208/264; 261/108

(58) Field of Classification Search
USPC .......................................... 422/606, 607, 632
See application file for complete search history.

(56) References Cited

U.S. PATENT DOCUMENTS

| 3,996,025 | A | | 12/1976 | Gulden |
| 4,126,539 | A | * | 11/1978 | Derr et al. ..................... 208/108 |
| 5,484,578 | A | * | 1/1996 | Muldowney et al. ......... 422/220 |
| 7,182,922 | B2 | | 2/2007 | Boyer et al. |
| 7,972,570 | B2 | | 7/2011 | Vieira et al. |
| 8,517,353 | B2 | * | 8/2013 | Bannon ........................ 261/110 |
| 2004/0197245 | A1 | | 10/2004 | Boyer et al. |
| 2009/0155147 | A1 | | 6/2009 | Vieira et al. |

FOREIGN PATENT DOCUMENTS

| EP | 2075056 A1 | 7/2009 |
| FR | 2282060 A1 | 3/1976 |
| FR | 2853260 A1 | 10/2004 |

OTHER PUBLICATIONS

Search Report for FR 1102981 (Mar. 12, 2012).

* cited by examiner

*Primary Examiner* — Jennifer A Leung
(74) *Attorney, Agent, or Firm* — Millen, White, Zelano & Branigan, P.C.

(57) ABSTRACT

A plate that allows the distribution of a polyphase mixture in a reactor that operates in the trickle mode and that consists of at least one gaseous phase and at least one liquid phase, with the plate (10) being located above a catalytic particle bed, comprising a number of shafts (3), and a portion of the shafts of the plate, located close to the wall of the reactor chamber, called peripheral shafts, are truncated. The plate is used in a reactor for the purpose of carrying out hydrotreatment, hydrogenation, or oxidation.

8 Claims, 1 Drawing Sheet

DISTRIBUTOR PLATE FOR THE DISTRIBUTION OF A POLYPHASE MIXTURE WITH PERIPHERY-TRUNCATED SHAFTS

FIELD OF THE INVENTION

This invention relates to the field of the distribution of polyphase fluids in catalytic reactors. It relates more particularly to a distributor plate that makes it possible to ensure the distribution of fluids in fixed-bed-type catalytic reactors, with fluids flowing in downward co-current, more particularly in the so-called "trickle" mode.

This invention applies in particular to the field of gas/liquid distributors that are used for implementing reactions of hydrocracking, hydrotreatment, hydrodesulfurization, hydrodemetallization, hydrodenitration, or selective or total hydrogenations. This invention also applies to the field of selective hydrogenations of steam-cracking gasolines, hydrogenations of aromatic compounds in aliphatic and/or naphthenic fractions, and hydrogenations of olefins in aromatic fractions.

More generally, in all of the fixed-bed reactors that require the mixing of a gaseous phase and a liquid phase, for example in the case of reactors for implementing a partial or total oxidation reaction, this invention pertains to reactions of amination, acetyl oxidation, ammoxidation, and halogenation, in particular chlorination.

The distributor plate according to this invention is therefore in general arranged in a chamber or reactor that comprises an intake for a liquid fluid and an intake for a gaseous fluid and that contains at least one bed of granular solids placed downstream from the distributor plate.

Within the framework of this invention, the distributor plate is arranged at the top of the reactor above the catalytic solid bed.

EXAMINATION OF THE PRIOR ART

To improve the distribution of gas and liquid fluids with these devices, one possibility that is used in the prior art consists in using distributor plates that comprise a number of mixing channels, also called shafts, dedicated to the passage of gas and liquid. These mixing channels can be of different types and positioned according to different configurations on the plate.

Such devices are described in the patent applications FR 2 807 676, FR 2 745 202, FR 2 853 260 or US 2007/0241467. In a general manner, these mixing channels are arranged in a perpendicular manner to the distributor plate, i.e., essentially vertically.

These devices limit the height of the catalytic bed because of the height of the mixing channels and because the tops of most of the reactors are generally in the form of a hemispherical cap. The limitation of the height of the catalytic bed reduces the catalytic activity of the reactor and consequently the conversion.

The height from which this hemispherical cap begins is called a tangent line ("tangent line" according to English terminology). The installation of the plate is done by means of panels of a certain size, a size that is necessarily smaller than the diameter of the entrance pipe into the reactor.

The plate is therefore generally mounted in the reactor, starting from panels introduced individually and consequently fixed between them. These panels should be able to be installed in the reactor. The height of the shafts ensures that they cannot be brought to a height that significantly exceeds the tangent line, for reasons of space requirements and difficulty of installation, because the hemispherical curve of the height of the reactor prevents their installation at the hemispherical cap. Actually, the plate is generally located under this tangent line.

In iso-size to the reactor chamber, the installation of the distributor plate at a lower level ensures that it is therefore not possible to always have the catalytic volume at the desired value. Or, from another standpoint, with a given catalyst volume, it is then necessary to use a reactor chamber of larger size.

This invention has as its object to eliminate this drawback of the prior art by proposing a distribution plate, which makes possible its installation higher inside the reactor, i.e., more specifically at a shorter distance from the hemispherical top of the reactor and optionally at a level that is located inside the hemispherical cap. Consequently, the distributor plate according to this invention makes it possible to increase the height of the catalytic bed and therefore the chemical conversion.

SUMMARY DESCRIPTION OF THE INVENTION

This invention describes a plate that makes possible the distribution of a polyphase mixture in a reactor that operates in the trickle mode, i.e., in downward co-current of the gas and liquid phases, with the liquid constituting the dispersed phase that has a surface velocity that is less than 1.5 cm/s, and the gas phase that constitutes the continuous phase.

For all practical purposes, the reactor has vertical walls (1) and ends with a hemispherical cap (2). The plate according to this invention is defined in such a way as to allow its higher implantation in the reactor, optionally until it occupies a portion of the space that is defined by the hemispherical cap (2).

The distributor plate according to this invention is located above a bed of solid particles (30) constituting the catalyst and comprises a number of shafts (3), characterized in that a portion of these shafts located on the periphery, so-called peripheral shafts, have a height Hp that is strictly less than the height of the shafts that are located toward the center, so-called central shafts. It is said that these peripheral shafts are truncated.

According to a preferred embodiment of the invention, the truncated shafts are those that form the peripheral row that is closest to the wall (1 or 2) of the reactor chamber and located at a distance from the wall (1 or 2) of the reactor chamber of between 25 and 250 mm. The idea of peripheral shafts also extends to the second row of shafts located at a distance from the wall (1) of the reactor of between 250 mm and 450 mm. Overall, therefore, the distance (D1) to the wall over which the peripheral shafts extend is between 25 and 450 mm and preferably between 25 and 250 mm.

All of the shafts of the plate, central or peripheral, are actually separated by a span P of between 100 and 250 mm, and preferably between 100 and 200 mm.

According to one embodiment of the invention, the non-peripheral shafts, called central shafts, have a height (Hc) of between 100 and 500 mm, and the peripheral shafts have a height (Hp) that is reduced by 25 to 350 mm relative to the central shafts. Preferably, the height (Hc) of the central shafts is between 200 mm and 350 mm.

More specifically, the peripheral shafts are truncated at a distance of between 1 and 100 mm, preferably between 1 mm and 50 mm, and in a more preferred manner of between 1 and 30 mm above the last passage opening (4) that is provided for the liquid. The expression "last opening" is to be understood as designating the opening (4) that is placed in the highest position along the vertical axis of the shafts (3).

Actually, the central or peripheral shafts have openings (4) that are distributed over the height of said shafts to make it possible for the liquid to pass inside the shafts. The central shafts also have an opening (5) at their upper end for the passage of gas.

The peripheral shafts do not have such an opening for the passage of gas.

It actually has been discovered, surprisingly enough, that the so-called trickle flow, which is desired in the processes where this plate finds its applications, was virtually not modified by the elimination of the gas intake located at the upper end of the peripheral shafts.

According to an embodiment of the invention, the passage openings for the liquid (4) are openings that are circular in shape or essentially vertical slots.

According to a preferred embodiment of the invention, the plate (10) is equipped with a dispersion system (20) that is placed under said plate (10) at a distance from the latter that is between 10 mm and 100 mm. This dispersion system generally consists of a grid or a deflector.

The invention also relates to a process that employs a plate as described above, designed to carry out reactions of hydrotreatment or hydrogenation or oxidation.

The invention also relates to any process for hydrotreatment or hydrogenation of petroleum fractions that have C4 to C20 carbon atoms that use a two-phase flow in downward co-current of the gas and liquid phases, in which the gas phase is the continuous phase and the liquid phase is the dispersed phase, said liquid phase having a surface velocity that is less than 1.5 cm/s.

DETAILED DESCRIPTION OF THE INVENTION

Figure 1:
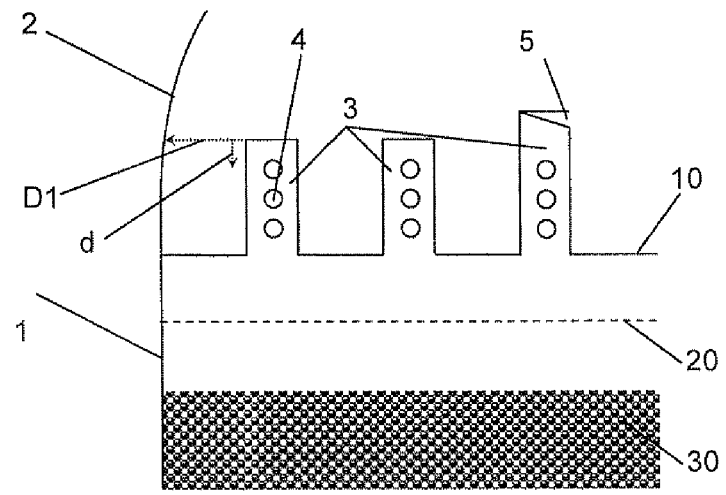
FIG. 1 according to this invention shows a distributor plate according to this invention that consists of two types of shafts.

The distributor plate involves two types of shafts:
Peripheral shafts (3) that constitute the most outside row of said plate or the two most outside rows, of height Hp, having openings (4) for the passage of liquid distributed along the walls, the highest opening being located at a distance of between 1 and 50 mm, and preferably between 1 and 30 mm, of the upper end of the shaft.

The so-called peripheral shafts are located at a distance D1 from the wall (1) of the reactor of between 25 and 450 mm, and preferably between 25 and 250 mm.

The peripheral shafts (3) do not comprise an opening for the passage of gas, located at the upper end of the shaft.

The peripheral shafts (3), i.e., those that form the first or the two first rows relative to the wall (1) of the reactor chamber, are shortened at the last opening (4) that makes possible the passage of the liquid while respecting a minimum distance (d) relative to this last opening (4) that is between 1 and 100 mm, preferably between 1 and 50 mm, and in an even more preferred manner between 1 and 30 mm.

The so-called central shafts occupy the remainder of the plate (10). They are identical to the peripheral shafts except for their height Hc that is strictly greater than that of the peripheral shafts Hp. The diameter and the distribution of the openings (4) for the passage of the liquid are identical to those of the peripheral shafts.

The central shafts also have an opening (5) for the passage of the gas that is located at the upper end. This opening (5) can have various shapes such as, for example, and in a non-exhaustive manner, a beveled shape or a large opening that occupies the entire upper end.

The central shafts therefore have a height Hc that is referenced relative to the base of the plate (10) of between 100 and 500 mm, preferably between 200 and 350 mm.

The plate (10) according to the invention can be used in a reactor that operates in a trickle mode, in which the gaseous phase corresponds to the continuous phase of the two-phase flow, and the liquid phase exists in the form of threads with a liquid surface velocity of less than 1.5 cm/s.

The plate according to the invention can be equipped with a dispersion system that is placed under the plate (10) but above the catalytic bed and downstream at a distance of between 10 and 100 mm from the base of the plate (10).

Figure 2:
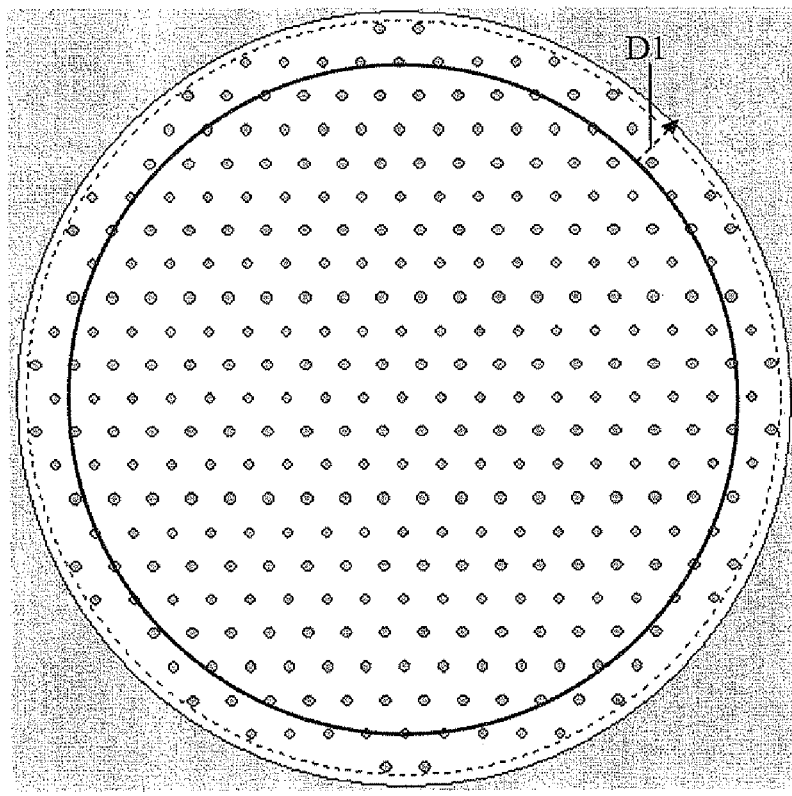
FIG. 2 shows a top view of a plate of the invention.

FIG. 2 is a top view that makes it possible to show the dimension D1 that precisely defines the location of the peripheral shafts. The truncated peripheral shafts are located between the walls of the reactor and the circumference at a distance D& from the wall of the reactor.

The invention is illustrated by the following example.

EXAMPLE

In this example, two plates are compared: one according to the prior art comprising shafts that all have the same size, and the other according to the invention comprising truncated peripheral shafts and central shafts of the same dimension as the shafts of the plate according to the prior art.

Plate According to the Prior Art

The distributor plate comprises shafts of 250 mm in height above the distributor plate and 50 mm in diameter, comprising 3 series of openings (4) for the passage of liquid, located respectively at 50/100/150 mm of height relative to the base of the shafts (3), with a beveled opening (5) of 50 mm in the upper portion for allowing the gas to pass.

The span between the shafts is 200 mm.

The distributor plate is located 29 mm below the tangent line (6) at which the upper hemisphere of the ring begins.

The diameter of the ring is 5,000 mm, and the upper hemispherical height of the ring is 2,500 mm.

Plate According to the Invention

The closest shafts of the wall (1) are truncated at 160 mm in height above the distributor plate, or 10 mm above the center of the last series of openings (4).

The distributor plate can therefore be mounted at a height of 90 mm (250–160). The distributor plate is therefore now located 61 mm above the tangent line. This gain in height is used to increase the catalytic height that is available in the reactor.

The operation is studied for the two types of plates with the following operating conditions:
Liquid entry speed into the bed: 1 cm/s.
Temperature: 650 K.
Pressure: 40 bar. (1 bar=$10^5$ pascals)
2% by weight of sulfur in the feedstock.
Density of the feedstock 800 kg.m$^{-3}$, and
Heat storage capacity of the feedstock 1,800 J/kg/K.

Chemical reaction on the order of 1 relative to the sulfur-containing compound of the feedstock and relative to hydrogen.

Reaction characteristics: KO 5.1.10$^7$, Ea (activation energy)=120 kJ/mol, DH=75 kJ/mol of S.

Results:

With the plate according to the prior art, the exit sulfur concentration that is obtained=10 ppm.

With the plate according to the invention, a gain of 90 mm of catalytic bed height, or a catalytic bed height of 3,090 mm, is obtained.

The initial height of 3,000 mm of catalytic bed is increased by 90 mm won by the positioning of the plate, higher in the ring. This gain in height, and therefore in catalytic volume, makes it possible to push further the desulfurization of the feedstock. The exit sulfur concentration rises to 7.6 ppm.

The positioning that is more in terms of height of the distributor plate according to the invention therefore ultimately allowed an increase in the degree of desulfurization of virtually 25% relative to the positioning according to the prior art.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 11/02981, filed Sep. 30, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A distributor plate (10) that allows distribution of a polyphase mixture in a reactor, when the plate (10) is located in an upper part of the reactor above a catalytic particle bed (30), said distributor plate comprising a number of shafts (3) that are equipped with openings (4) allowing passage of liquid that are distributed over a portion of their height, a portion of the shafts located on the periphery of a plate called peripheral shafts have a height Hp that is lower than the height Hc of shafts located at a center of the plate, called central shafts, wherein the peripheral shafts do not have an opening at their upper end, the central shafts in contrast having an opening (5) at their upper end.

2. The distributor plate according to claim 1, wherein the distance D1 over which the peripheral shafts extend relative to the wall (1) of the reactor is between 25 and 250 mm.

3. The distributor plate according to claim 1, wherein the difference in height between the central shafts and the peripheral shafts is between 25 and 350 mm.

4. The distributor plate according to claim 1, wherein the openings (4) are distributed along the walls of the shafts, the highest opening being located at a distance of between 1 and 50 mm, of the upper end of the shaft.

5. The distributor plate according to claim 1, wherein the peripheral and central shafts are separated by a span of between 100 and 250 mm.

6. The distributor plate according to claim 1, wherein the central shafts have a height (Hc) of between 100 and 500 mm.

7. The distributor plate according to claim 1, located in a reactor in an upper part, above a catalytic particle bed (30), in which the peripheral shafts are located at a distance D1 from a wall (1) of the reactor of between 25 and 450 mm.

8. A process for hydrotreatment or hydrogenation of petroleum fractions that have C4 to C20 carbon atoms, comprising hydrogenation or treating said fractions in the reactor comprising the distributor plate according to claim 1, said process comprising operating the reactor in a trickle mode, by providing a downward cocurrent flow of a dispersed liquid phase having a surface velocity that is lower than 1.5 cm/s and a gaseous phase that is a continuous phase.

* * * * *